United States Patent
Gemello et al.

(10) Patent No.: US 7,769,580 B2
(45) Date of Patent: Aug. 3, 2010

(54) METHOD OF OPTIMISING THE EXECUTION OF A NEURAL NETWORK IN A SPEECH RECOGNITION SYSTEM THROUGH CONDITIONALLY SKIPPING A VARIABLE NUMBER OF FRAMES

(75) Inventors: Roberto Gemello, Turin (IT); Dario Albesano, Turin (IT)

(73) Assignee: Loquendo S.p.A., Turin (IT)

( * ) Notice: Subject to any disclaimer, the term of this patent is extended or adjusted under 35 U.S.C. 154(b) by 738 days.

(21) Appl. No.: 10/538,876

(22) PCT Filed: Dec. 23, 2002

(86) PCT No.: PCT/EP02/14718

§ 371 (c)(1),
(2), (4) Date: Jun. 14, 2005

(87) PCT Pub. No.: WO2004/057573

PCT Pub. Date: Jul. 8, 2004

(65) Prior Publication Data

US 2006/0111897 A1 May 25, 2006

(51) Int. Cl.
*G10L 11/00* (2006.01)
*G10L 15/00* (2006.01)
(52) U.S. Cl. ............... 704/202; 704/231; 704/232
(58) Field of Classification Search ........... 704/202, 704/231–232
See application file for complete search history.

(56) References Cited

U.S. PATENT DOCUMENTS 4,379,949 A * 4/1983 Chen et al. ............... 375/240

(Continued)

FOREIGN PATENT DOCUMENTS

EP 0 733 982 A1 9/1996

OTHER PUBLICATIONS

Finke, et al., "Modeling and Efficient Decoding of Large Vocabulary Conversational Speech", Interactive Systems Inc., Eurospeech, Budapest, pp. 1-4, (1999).

*Primary Examiner*—Richemond Dorvil
*Assistant Examiner*—Eric Yen
(74) *Attorney, Agent, or Firm*—Finnegan, Henderson, Farabow, Garrett & Dunner, L.L.P.

(57) ABSTRACT

A method of optimizing the execution of a neural network in a speech recognition system provides for conditionally skipping a variable number of frames, depending on a distance computed between output probabilities, or likelihoods, of a neural network. The distance is initially evaluated between two frames at times 1 and 1+k, where k is a predetermined maximum distance between frames, and if such distance is sufficiently small, the frames between times 1 and 1+k are calculated by interpolation, avoiding further executions of the neural network. If, on the contrary, such distance is not small enough, it means that the outputs of the network are changing quickly, and it is not possible to skip too many frames. In that case, the method attempts to skip remaining frames, calculating and evaluating a new distance.

20 Claims, 2 Drawing Sheets

U.S. PATENT DOCUMENTS

| | | | | |
|---|---|---|---|---|
| 4,489,434 A * | 12/1984 | Moshier | | 704/239 |
| 5,317,673 A * | 5/1994 | Cohen et al. | | 704/232 |
| 5,461,696 A * | 10/1995 | Frank et al. | | 704/232 |
| 5,461,699 A * | 10/1995 | Arbabi et al. | | 706/21 |
| 5,638,487 A * | 6/1997 | Chigier | | 704/253 |
| 5,689,616 A * | 11/1997 | Li | | 704/232 |
| 5,924,065 A * | 7/1999 | Eberman et al. | | 704/231 |
| 6,009,391 A * | 12/1999 | Asghar et al. | | 704/243 |
| 6,061,652 A * | 5/2000 | Tsuboka et al. | | 704/245 |
| 6,064,958 A * | 5/2000 | Takahashi et al. | | 704/243 |
| 6,118,392 A * | 9/2000 | Levine | | 341/60 |
| 6,253,178 B1 | 6/2001 | Robillard et al. | | |
| 6,404,925 B1 * | 6/2002 | Foote et al. | | 382/224 |
| 6,411,903 B2 * | 6/2002 | Bush | | 702/14 |
| 6,418,405 B1 * | 7/2002 | Satyamurti et al. | | 704/206 |
| 6,418,407 B1 * | 7/2002 | Huang et al. | | 704/207 |
| 6,496,798 B1 * | 12/2002 | Huang et al. | | 704/230 |
| 6,567,775 B1 * | 5/2003 | Maali et al. | | 704/231 |
| 6,801,895 B1 * | 10/2004 | Huang et al. | | 704/270 |
| 6,944,315 B1 * | 9/2005 | Zipperer et al. | | 382/103 |
| 7,391,907 B1 * | 6/2008 | Venetianer et al. | | 382/224 |
| 7,433,820 B2 * | 10/2008 | Garg et al. | | 704/256.8 |
| 2001/0037178 A1 * | 11/2001 | Bush | | 702/14 |
| 2003/0023382 A1 * | 1/2003 | Nyland | | 702/14 |

* cited by examiner

METHOD OF OPTIMISING THE EXECUTION OF A NEURAL NETWORK IN A SPEECH RECOGNITION SYSTEM THROUGH CONDITIONALLY SKIPPING A VARIABLE NUMBER OF FRAMES

CROSS REFERENCE TO RELATED APPLICATION

This application is a national phase application based on PCT/EP2002/014718, filed Dec. 23, 2002, the content of which is incorporated herein by reference.

FIELD OF THE INVENTION

The present invention relates generally to speech recognition systems capable of recognizing spoken utterances, e.g. phrases, words or tokens, that are within a library developed by neural network-based learning techniques. More particularly, the invention concerns a method of speeding up the execution of neural networks for optimising the system performance, and to a speech recognition system implementing such method.

BACKGROUND ART

An automatic speech recognition process can be schematically described by means of a plurality of modules, arranged sequentially between an input vocal signal and an output sequence of recognised words:

- a first signal processing module, for digitising the incoming vocal signal; for example, for telephone speech, the sampling rate is 8000 samples per second; the vocal signal is transformed from analogue to digital and opportunely sampled; the waveform is then divided into "frames", where each frame is a small segment of speech that contains an equal number of waveform samples. In the following we assume a frame size of 10 msec, containing for example 80 samples (telephone speech);
- a second feature extraction module, for computing features that represent the spectral-domain content of the vocal signal (regions of strong energy at particular frequencies); these features are computed every 10 msec, in correspondence with each frame;
- a third module for pattern matching and temporal alignment; a Viterbi algorithm can be used for temporal alignment, for managing temporal distortions introduced by different speech speeds, while a neural network (also called an ANN, multi-layer perceptron, or MLP) can be used to classify a set of features into phonetic-based categories at each frame;
- a fourth linguistic analysis module, for matching the neural-network output scores to the target words (the words that are assumed to be in the input speech), in order to determine the word that was most likely uttered.

In the above mentioned process the neural networks are used in the third module as regards the acoustic pattern matching, for estimating the probability that a portion of a vocal signal belongs to a particular phonetic class, chosen in a set of predetermined classes, or constitutes a whole word in a predetermined set of words.

It is well known that the execution of a neural network, when it is carried out by emulation on a sequential processor, is very burdensome, especially in cases requiring networks with many thousands of weights. If the need arises to process, in real time, signals continuously varying through time, such as for speech signals, use of this technology takes on additional difficulties.

A first attempt to solve such problem has been made in EP 0 733 982, wherein a method of speeding the execution of a neural network for correlated signal processing is disclosed. The method is based upon the principle that, since the input signal is sequential and evolves slowly and continuously through time, it is not necessary to compute again all the activation values of all neurons for each input, but rather it is enough to propagate through the network the differences with respect to the previous input. That is, the operation does not consider the absolute neuron activation values at time t, but the differences with respect to activation values at time t−1. Therefore at any point of the network, if a neuron has, at time t, an activation that is sufficiently similar to that of time t−1, that neuron does not propagates any signal, limiting the activity to only neurons having an appreciable change in the activation level. The method disclosed in EP 0 733 982 allows a saving, in terms of running-times, of about ⅔ of the original running time.

A second method for reducing the load on a processor when running a speech recognition system is disclosed in document U.S. Pat. No. 6,253,178. Such method includes two steps, a first step of calculating feature parameters for a reduced set of frames of the input speech signal, decimated to select K frames out of L frames of the input speech signal according to a decimation rate K/L. The result of the first step is a first series of recognition hypothesis whose likelihood is successively re-calculated (re-scoring phase) by the second recognition step, which is more detailed and uses all the input frames. Although the execution of the first step allows to reduce computing times, the second recognition step requires however high processing load. Moreover the two step recognition technique (coarse step and detailed step) has a basic problem, if the first step misses a correct hypothesis, such hypothesis cannot any more recovered in the second step.

A further well known technique for speeding the execution of a speech recognition system provides for skipping one or more frames in those regions where the signal is stationary. Such technique in based, in the prior art, on measuring a cepstrum distance between features extracted from frames of the input signal, i.e. such distance is measured on the input parameters of the pattern matching module.

An example of such technique is disclosed in "Modeling and Efficient Decoding of Large Vocabulary Conversational Speech", Michael Finke, Jürgen Fritsch, Detlef Koll, Alex Waibel, Eurospeech 1999 Budapest. In such document the recognition process, in particular the acoustic model evaluation, is sped up by a dynamic frame skipping technique. The frame skipping technique based on the idea of re-evaluating acoustic models only provided the acoustic vector changed significantly from a time t to a time t+1. A threshold on the Euclidean distance is defined to trigger re-evaluation of the acoustics. To avoid skipping too many consecutive frames only one skip is allowed at a time, i.e. after skipping one frame the next one must be evaluated. Such method, based on the cepstrum distance between input parameters, is not accurate, as the distribution of the acoustic parameters is a "multi-mode" distribution, even in the same acoustic class. As a consequence, frames having a high cepstrum distance can actually belong to the same acoustic class. Moreover such method does not allow to skip more than one frame at a time.

The Applicant has tackled the problem of optimising the execution time of a neural network in a speech recognition system, maintaining high accuracy in the recognition process. To this purpose a method of speeding the execution of a neural network, allowing to skip a variable number of frames depending on the characteristics of the input signal, is disclosed.

The Applicant observes that the accuracy of a recognition process can be maintained at high levels, even if more than one consecutive input frame is skipped in those regions where the signal is supposed to be stationary, provided that the distance between non-consecutive frames is measured with sufficient precision.

The Applicant has determined that, if the measurement of such distance is based on the probability distributions, or likelihoods, of the phonetic units computed by the neural network, such measurement can be particularly precise.

In view of the above, it is an object of the invention to provide a method of optimising the execution of a neural network in a speech recognition system allowing to conditionally skip a variable number of frames of an input speech signal.

SUMMARY OF THE INVENTION

According to the invention that object is achieved by means of a method of optimising the execution of a neural network in a speech recognition system, by conditionally skipping a variable number of frames, depending on a distance computed between output probabilities, or likelihoods, of the neural network. The distance is initially evaluated between two frames at times t and t+k, where k is a predetermined maximum distance between frames, and if such distance is sufficiently small, the frames comprised between times t and t+k are calculated by interpolation, avoiding further executions of the neural network. If, on the contrary, such distance is not small enough, it means that the outputs of the network are changing quickly, and it is not possible to skip too much frames. In that case the method attempts to skip less frames (for example k/2 frames), calculating and evaluating a new distance.

BRIEF DESCRIPTION OF THE DRAWINGS

The invention will now be described, by way of example only, with reference to the annexed figures of drawing, wherein.

DETAILED DESCRIPTION OF A PREFERRED EMBODIMENT OF THE INVENTION

Figure 1:
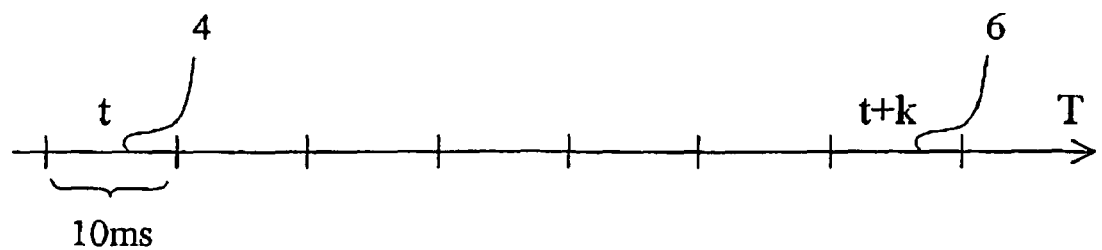
FIG. 1 shows schematically a sequence of frames of an input speech signal.

With reference to FIG. 1, a plurality of frames of a digitised input speech signal are schematically represented on a time axis T. Each frame is a small segment of speech, for example having a size of 10 ms, containing an equal number of waveform samples, for example 80 samples assuming a sampling rate of 8 KHz.

The method according to the invention measures a distance between two non-consecutive frames, for example frames 4 and 6 in FIG. 1, corresponding to time slots t and t+k on time axis T, for evaluating the possibility of skipping the run of the neural network in correspondence of one or more frames comprised between frames 4 and 6.

In order to measure such distance the method computes, for each frame 4 and 6, a corresponding feature vector which is passed as an input parameter to the neural network. The output of the neural network is a probability, or likelihood, for each phonetic category, that the current frame belongs to that category. The distance, as explained in detail hereinbelow, is computed between output parameters, or likelihoods, of the neural network.

If the distance measured between frames t and t+k is small enough, i.e. lower then a predetermined threshold, it is presumed that the input speech signal is in a stationary phase and the output parameters of the neural network are not changing. In such case the method decides that is not necessary to calculate exactly, by means of the computation of features and the run of the neural network, the output parameters, or likelihoods, corresponding to the intermediate frames between t and t+k. The likelihoods are therefore calculated by interpolation, for example a linear interpolation, between the likelihoods corresponding to frames t and t+k.

If, on the contrary, the distance is not small enough, i.e. equal or greater then a predetermined threshold, it is presumed that the output parameters of the neural network are in an unsteady phase, and it is not possible to skip the run of the neural network in correspondence of intermediate frames between t and t+k. In such case the method tries to skip a reduced number of frames, applying recursively the above mentioned procedure on sub-intervals of frames comprised within t and t+k. The method ends when all likelihoods in the main interval t, t+k have been calculated, by interpolation or by running the neural network. In the worst case all the likelihoods are calculated exactly by means of the neural network.

As the output parameters of the neural network, or likelihoods, can be interpreted as probability distributions over acoustic units, the distance is calculated as a distance between probability distributions, according to the Kullback symmetric distance formula:

$$KLD(P_1, P_2) = \int [p_1(y) - p_2(y)] \ln \frac{p_1(y)}{p_2(y)} dy$$

where $P_1$ and $P_2$ are the probability distributions, or likelihoods.

The KLD function assumes a positive value which approaches zero when the two probability distributions $P_1$ and $P_2$ are identical.

The method can be implemented by means of an algorithm which makes use of a lookahead buffer for storing the whole interval of frames comprised between t and t+k.

In the following the term "neural motor" is intended as the combination of the implementation of the algorithm method, a feature extraction module and the neural network.

The method comprises an initialisation phase in which the neural motor stores a number of frames, received from the front-end, equal to the length of the lookahead buffer, without outputting any lookahead value to the matching module. After this initialisation phase the neural motor becomes synchronous with the front-end and matching module, for reaching a final phase in which the buffer is emptied. The filling and emptying operations of the buffer take place alternately, i.e. the buffer is not refilled until it has not been completely emptied, and the likelihoods are calculated in a burst mode, only when the buffer is completely full.

The method operates according to the following main steps:

a) buffering a plurality N (where N=k+1) of input frames;

b) defining an interval corresponding initially to a main interval of frames delimited by a first 4 and a second 6 non-consecutive buffered frames;

c) calculating, by means of the neural network, a first and a second likelihood corresponding to the frames delimiting the interval;

d) calculating a symmetric Kullback distance between the first and the second likelihoods;

e) comparing the Kullback distance with a predetermined threshold value S and, in case the distance is lower than the threshold value S, calculating by interpolation between the first and the second likelihoods, the likelihood or likelihoods corresponding to the frame or frames comprised within the interval, or, in case the distance is greater than the threshold value S, calculating, by means of the neural network, at least one likelihood corresponding to a frame comprised within the interval;

f) applying recursively said steps c) to e) to each interval present as a sub-interval within said main interval, containing at least one frame whose likelihood has not been yet calculated, until all the likelihoods corresponding to the frames in the main interval have been calculated.

The interpolation operation used in step e) can be, for example, a linear interpolation.

The main interval of frames coincides preferably with the totality N of the buffered input frames.

The accuracy of the method is influenced mainly by two parameters, the length N of the lookahead buffer, which determines the maximum number of skipped frames, and the value of the threshold S on the Kullback distance.

As regards the first parameter N, an optimal value has been found in N=7 (max number of skipped frames=5).

The threshold value S influences directly the probability that a greater number of frames are skipped, and its choice can be determined, for example, considering the dimension of the vocabulary of words to be recognised.

Figure 2:
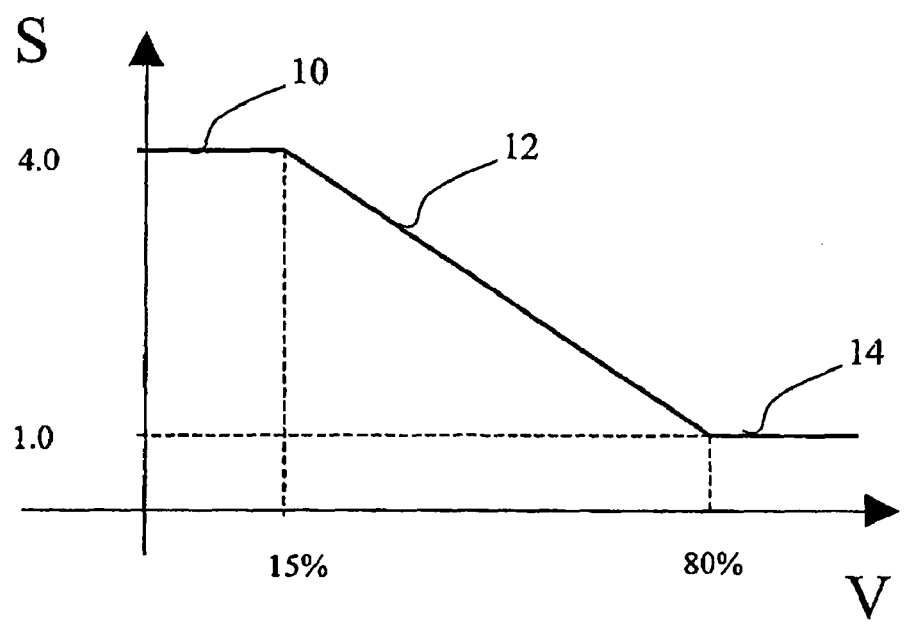
FIG. 2 is a diagram showing a threshold segmented function used by a method according to the present invention.

Assuming that the method is used for optimising the run of a neural network in a speech recognition already having optimal performances for managing large vocabularies, it has been found that an optimal solution is to use, as threshold value S, a fuzzy set as shown, for example, in FIG. 2. The said fuzzy set S, having a domain V corresponding to the percentage of output units of the neural network used by the current phonetic variability, is a linear segmented decreasing function. It assumes a maximum value of 4.0 in a first segment 10 and a minimum value of 1.0 in last segment 14, linearly decreasing from 4.0 to 1.0 in the middle segment 12.

If the phonetic variability V is lower than 15% the threshold is set to 4.0, while it is set to 1.0 when the phonetic variability V is comprised between 80% and 100%.

A possible implementation, independent from the buffer length, of the recursive algorithm used for calculating the likelihoods corresponding to the frames buffered in the lookahead buffer, will now be illustrated.

The recalled function is:

```
Do_run_skip( ) {
    <load lookahead with extremes s and e>;
    run(s);
    run(e);
    Run_skip(s,e);
}
``` where s and e are the extremes of the lookahead buffer, and the function "Run_skip(s,e)" is defined as follows:

```
Run_skip(h,k) {
    If ((k-h) == 1) return;
    D = kld(h,k);
    If(D < sieve)
        Then interpolate(h,k);
        Else {
            C = (int)(h+k)/2;
            Run(C);
            Run_skip(h,G);
            Run_skip(C,k);
        }
}
``` where "sieve" is the threshold value S and the auxiliary functions "run(k)", "interpolate (h,k) and "kld(h,k)" are defined as:

```
run(k): executes the run of the Neural Network on frame k;
Kld(h,k) {
    dist = 0;
    for(i=0; i<noutputs; i++) {
        dist += (output_h[i] – output_k[i]) * log(output_h[i]/
        output_k[i]);
    }
    return(dist);
}
interpolate(h,k) {
    for(i=0; i<noutputs; i++) {
        delta = (output_h[i] – output_k[i])/(k-h);
        for(j=1; j<(k-h-1); j++) {
            output_{h+j}[i] = output_h[i] + delta*j;
        }
    }
}
``` where "$output_h[i]$" indicates the output of the unit i of the neural network at frame h, and noutputs is the number of the output units of the neural network.

Operatively, the neural motor implementing the method operates as follows:

1. Initialisation. The neural motor, which incorporates the lookahead buffer, captures N frames in order to fill the buffer, without returning any parameter;

2. Run phase. The run phase can be different, depending on whether the lookahead buffer is in the filling phase or already filed:

2.1 When the buffer is not full the system is in a synchronous phase of lookahead buffer filling and contemporaneous releasing of likelihoods already calculated in a previous calculation phase. At every step of this phase a single frame is acquired from the front-end and buffered, releasing a pre-calculated likelihood. When the buffer is again full the calculation of the likelihoods can start, according to point 2.2.

2.2 When the buffer is full the system calculates, according to the method previously described, the likelihoods corresponding to all the frames present in the lookahead buffer.

3. Final phase. At the end, when the input frames sequence ends, all the likelihoods already calculated are sequentially released.

A speech recognition system implementing the above illustrated method comprises the following elements:
  a lookahead buffer for storing a plurality N of input frames;
  a distance evaluation unit for calculating the distance between likelihoods;
  a comparing unit for comparing the distance with the threshold value S;
  an interpolation unit for calculating one or more likelihoods comprised between two already calculated likelihoods.

Figure 3:
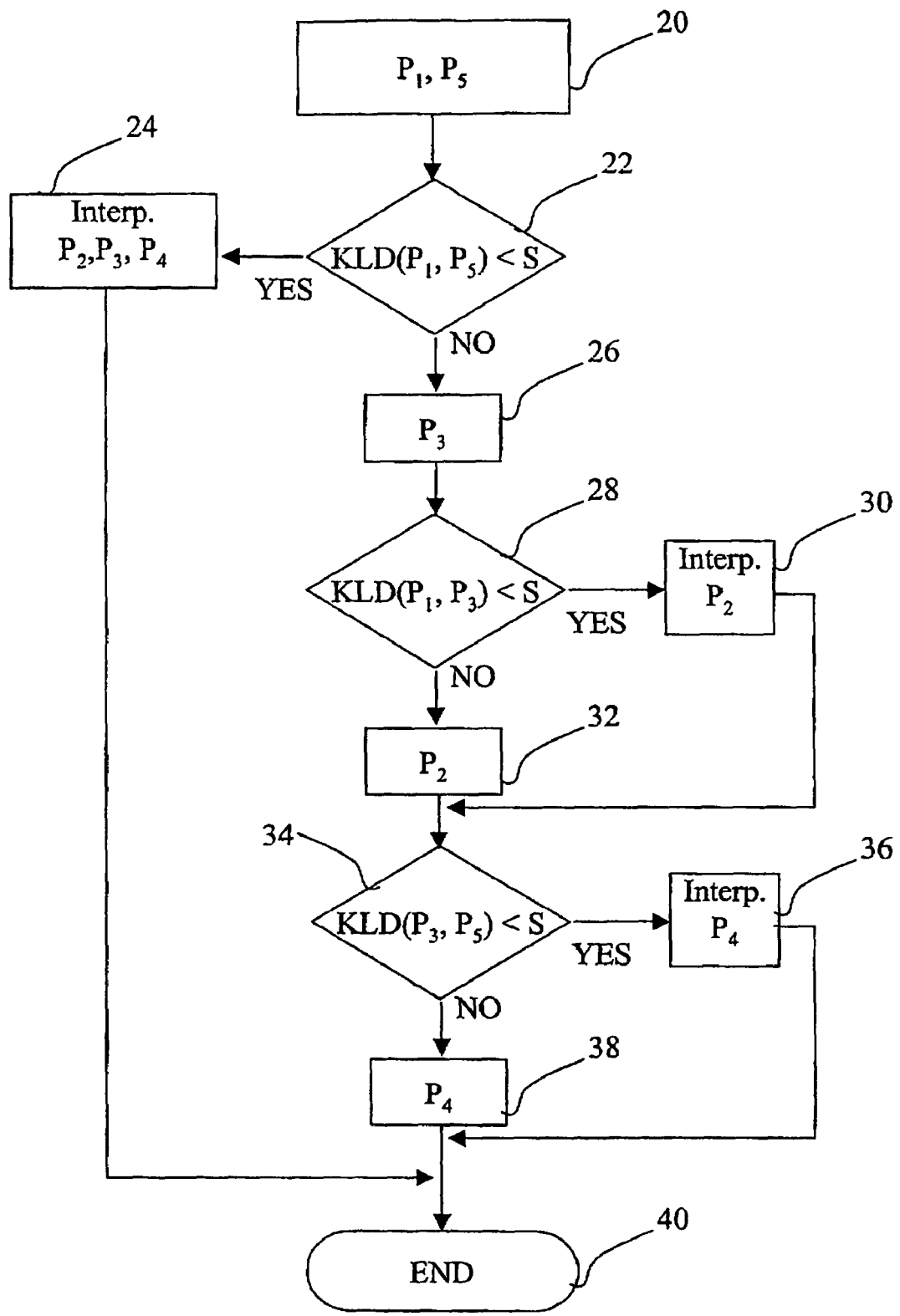
FIG. 3 is a flow diagram showing an example of implementation of a method according to the present invention.

In order to understand the operation of the method according to the invention, an example of application will now be described in detail, with reference to FIG. 3. The flow diagram shown in FIG. 3 illustrates how the method is applied in a case in which the length of the lookahead buffer is equal to 5 (max frames skipped=3).

```
Lookahead length = 5
<likelihoods P₁ and P₅ are calculated by means of the run
    of the neural network> (block 20)
        if <the distance between P₁ and P₅ is lower that
            threshold S> (block 22)
            then <likelihoods P₂, P₃ and P₄ are calculated by
                linear interpolation between likelihoods P₁ and P₅>
                (block 24)
            else <likelihood P₃ is calculated by means of the
                run of the neural network (block 26)
                if <the distance between P₁ and P₃ is lower
                    that threshold S> (block 28)
                    then <likelihood P₂ is calculated by linear
                        interpolation between likelihoods P₁ and
                        P₃> (block 30)
                    else <likelihood P₂ s calculated by means
                        of the run of the neural network (block 32)
                if <the distance between P₃ and P₅ is lower
                    that threshold S> (block 34)
                    then <likelihood P₄ is calculated by linear
                        interpolation between likelihoods P₃ and
                        P₅> (block 36)
                    else <likelihood P₄ is calculated by means
                        of the run of the neural network (block 38)
    return <likelihoods P₁...P₅, (block 40)
```

The method and system according to the present invention can be implemented as a computer program comprising computer program code means adapted to run on a computer. Such computer program can be embodied on a computer readable medium.

Some advantages of the method are the following:

the skip of frames is performed only after a precise evaluation of distances between output likelihoods, avoiding errors due to hazardous skipping;

if, due for example to mismatch or noise, the output likelihoods present an increased instability, the method reduces automatically the skip rate;

the method of optimisation is complementary to other optimisation methods, for example to the method disclosed in previously cited document EP 0 733 982, in the name of the same Applicant.

The invention claimed is:

1. A method of executing a neural network in a speech recognition system for recognizing speech of an input speech signal organized into a series of frames, comprising:

calculating, by means of said neural network, a first and a second likelihood corresponding to a first and a second non-consecutive frame;

calculating a distance between said first and second non-consecutive frames;

comparing said distance with a predetermined threshold value to evaluate a possibility of skipping at least one run of the neural network;

selectively skipping the at least one run of the neural network in correspondence to each frame between said first and said second non-consecutive frames to optimize the neural network when said distance is lower than said threshold value;

calculating a likelihood or likelihoods corresponding to each frame between said first and second non-consecutive frames;

calculating said distance as a distance between output likelihoods of said neural network; and providing an optimized neural network by outputting the likelihood or likelihoods corresponding to each frame between said first and second non-consecutive frames to a computer readable medium.

2. The method according to claim 1, further comprising:

a) buffering a plurality of input frames;

b) defining an interval corresponding initially to a main interval of frames delimited by a first and a second non-consecutive buffered frames;

c) calculating, by means of said neural network, said first and said second likelihood corresponding to said buffered frames delimiting said interval;

d) calculating a distance between said first and said second likelihoods;

e) comparing said distance between said first and said second likelihoods with a threshold value and, in case said distance between said first and said second likelihoods is lower than said threshold value, calculating by interpolation between said first and said second likelihoods, the likelihood or likelihoods corresponding to each frame between said first and said second nonconsecutive buffered frames, or, in case said distance between said first and said second likelihoods is greater than said threshold value, calculating, by means of said neural network, at least one other likelihood corresponding to at least one other frame within said interval; and f) applying recursively said steps c) to e) to each interval present as a sub-interval within said main interval containing at least one frame whose likelihood has not been yet calculated, until all the likelihoods corresponding to the frames in said main interval have been calculated.

3. The method as claimed in claim 2, wherein said interpolation is a linear interpolation.

4. The method as claimed in claim 2, wherein said main interval of frames comprises said plurality of buffered input frames.

5. The method as claimed in claim 2, wherein said likelihoods are probability distributions.

6. The method as claimed in claim 5, wherein said distance between said first and said second likelihoods is calculated as a symmetric Kullback distance between probability distributions.

7. The method as claimed in claim 2, wherein said threshold value is comprised of a fuzzy set.

8. The method as claimed in claim 7, wherein said fuzzy set has a domain corresponding to a percentage of output units of said neural network used by a current phonetic variability.

9. The method as claimed in claim 8, wherein said fuzzy set is a linear segmented decreasing function.

10. A speech recognition system for recognizing speech of an input speech signal, comprising:

a neural network for calculating likelihoods corresponding to frames of said input speech signal, comprising:

a buffer for storing a plurality of input frames;

a distance evaluation unit for calculating a distance between a first and a second likelihood, said first and second likelihoods being obtained by means of said neural network and corresponding to a first and a second non-consecutive buffered frames;

a comparing unit for comparing said distance with a predetermined threshold value to evaluate a possibility of skipping at least one run of the neural network; and an interpolation unit for, after the comparing, in case said distance is lower than said threshold value, skipping a run of the neural network corresponding to each of the frame or frames between said first and second non-consecutive frames to optimize the neural network, and calculating the likelihood or likelihoods corresponding to the frame or frames between said first and second non-consecutive buffered frames, and a computer readable medium for storing at least one output of the neural network, the at least one output comprising the likelihood or likelihoods corresponding to the frame or frames between said first and second non-consecutive buffered frames.

11. The speech recognition system according to claim 10, wherein said buffer is a lookahead buffer.

12. A non-transitory computer-readable medium for use on a computing system, the non-transitory computer-readable medium including computer-executable instructions for performing a method of executing a neural network in a speech recognition system for recognizing speech of an input speech signal organized into a series of frames, the method comprising:

calculating, by means of said neural network, a first and a second likelihood corresponding to a first and a second non-consecutive frame;

calculating a distance between said first and second non-consecutive frames;

comparing said distance with a predetermined threshold value to evaluate a possibility of skipping at least one run of the neural network;

selectively skipping the at least one run of the neural network in correspondence to each frame between said first and said second non-consecutive frames to optimize the neural network when said distance is lower than said threshold value;

calculating a likelihood or likelihoods corresponding to each frame between said first and second non-consecutive frames;

calculating said distance as a distance between output likelihoods of said neural network; and providing an optimized neural network by outputting the likelihood or likelihoods corresponding to each frame between said first and second non-consecutive frames to the computer readable medium.

13. The non-transitory computer-readable medium of claim 12, wherein the method further comprises:

a) buffering a plurality of input frames;

b) defining an interval corresponding initially to a main interval of frames delimited by a first and a second non-consecutive buffered frames;

c) calculating, by means of said neural network, said first and said second likelihood corresponding to said buffered frames delimiting said interval;

d) calculating a distance between said first and said second likelihoods;

e) comparing said distance between said first and said second likelihoods with a threshold value and, in case said distance between said first and said second likelihoods is lower than said threshold value, calculating by interpolation between said first and said second likelihoods, the likelihood or likelihoods corresponding to each frame between said first and said second nonconsecutive buffered frames, or, in case said distance between said first and said second likelihoods is greater than said threshold value, calculating, by means of said neural network, at least one other likelihood corresponding to at least one other frame within said interval; and f) applying recursively said steps c) to e) to each interval present as a sub-interval within said main interval containing at least one frame whose likelihood has not been yet calculated, until all the likelihoods corresponding to the frames in said main interval have been calculated.

14. The non-transitory computer-readable medium of claim 13, wherein said interpolation is a linear interpolation.

15. The non-transitory computer-readable medium of claim 13, wherein said main interval of frames comprises said plurality of buffered input frames.

16. The non-transitory computer-readable medium of claim 13, wherein said likelihoods are probability distributions.

17. The non-transitory computer-readable medium of claim 16, wherein said distance between said first and said second likelihoods is calculated as a symmetric Kullback distance between probability distributions.

18. The non-transitory computer-readable medium of claim 13, wherein said threshold value is comprised of a fuzzy set.

19. The non-transitory computer-readable medium of claim 18, wherein said fuzzy set has a domain corresponding to a percentage of output units of said neural network used by a current phonetic variability.

20. The non-transitory computer-readable medium of claim 19, wherein said fuzzy set is a linear segmented decreasing function.

* * * * *